Nov. 24, 1931.　　　O. A. KRENKE　　　1,833,490
SHOCK ABSORBER
Filed May 28, 1930　　2 Sheets-Sheet 2
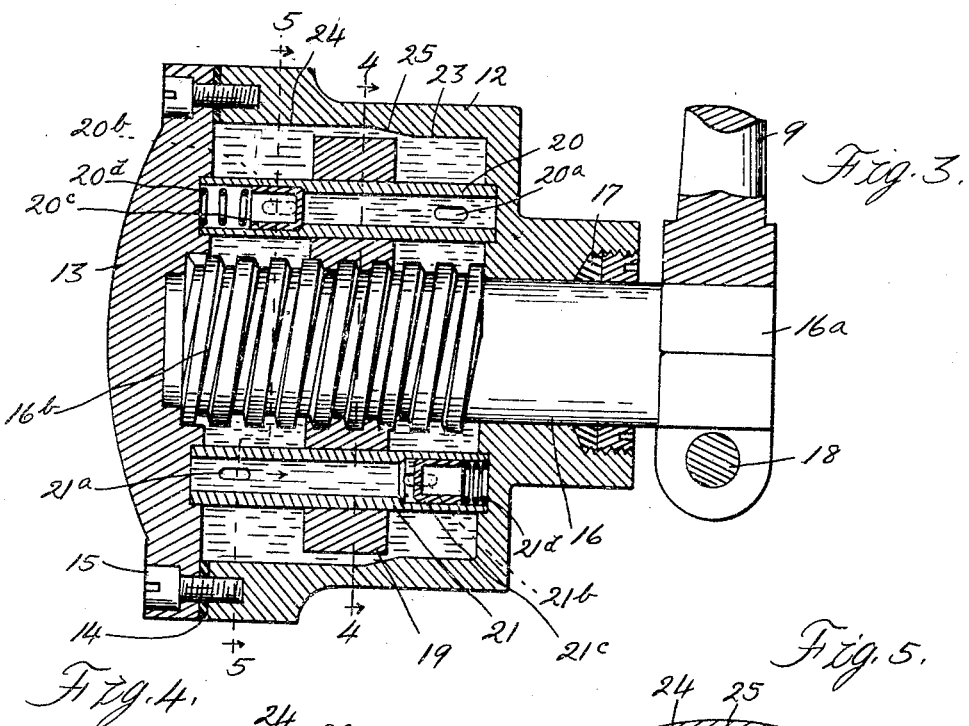
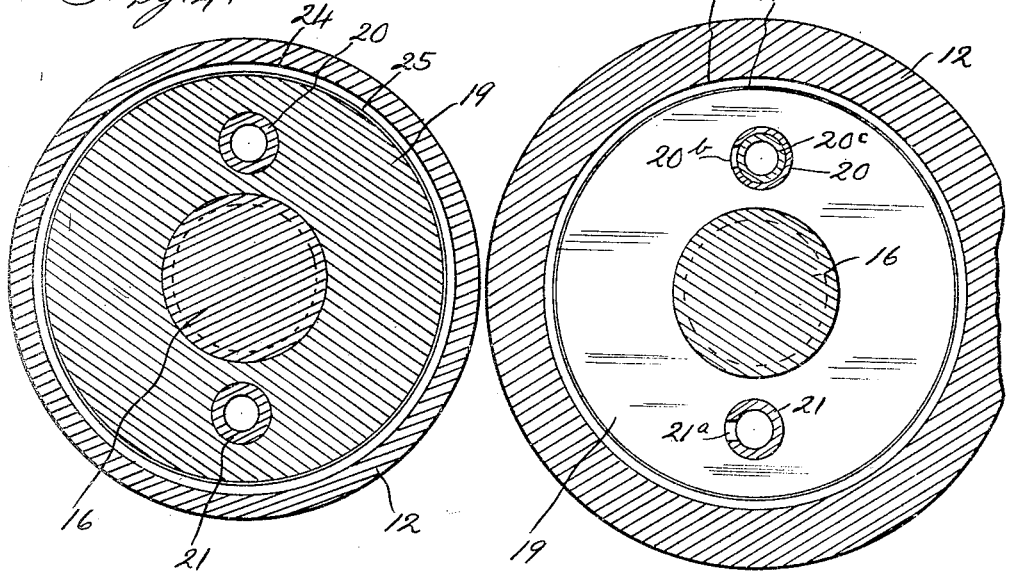
INVENTOR
Otto A. Krenke
BY
Swan & Frye
ATTORNEYS Patented Nov. 24, 1931

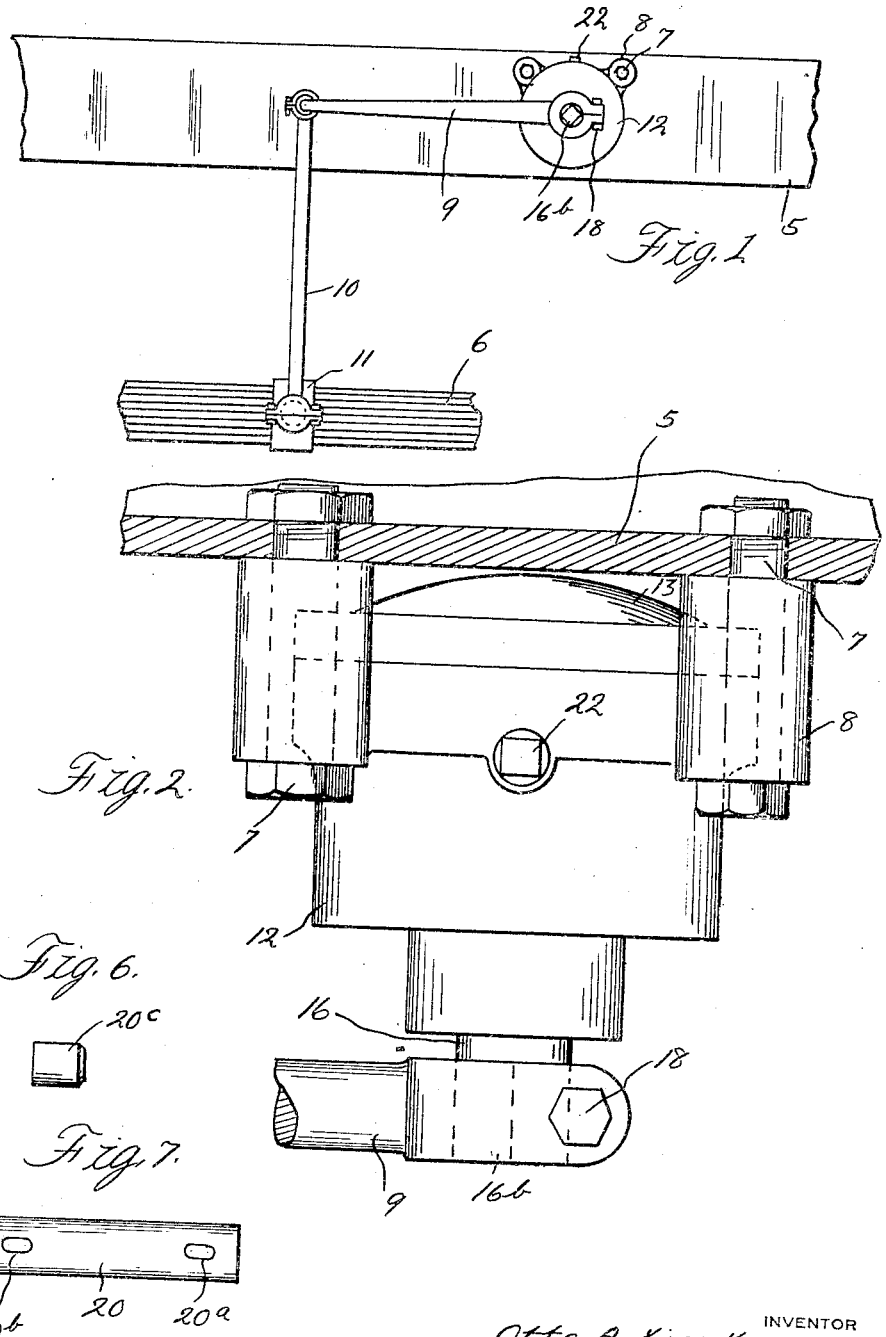

1,833,490

UNITED STATES PATENT OFFICE

OTTO A. KRENKE, OF PORT HURON, MICHIGAN, ASSIGNOR TO ANKER-HOLTH MANUFACTURING COMPANY, OF PORT HURON, MICHIGAN, A CORPORATION OF SOUTH DAKOTA

SHOCK ABSORBER

Application filed May 28, 1930. Serial No. 456,746.

This invention relates to shock absorbers, and more particularly to the type of shock absorbers utilized to control or modify the action of the supporting springs of automobiles and other vehicles.

One of the objects of the present invention is the provision of a two-way shock absorber that will limit the movement of a vehicle supporting spring in either direction, and wherein a greater retardation is supplied to limit movement in one direction than in the other.

Another object of this invention is the arrangement of a hydraulic shock absorber so that it will exert a retarding effect upon very slight movements of the supporting springs in either direction.

A further object of this invention is the provision of a shock absorber that is simple and compact, having few and comparatively easily manufactured parts that may be readily assembled by unskilled labor.

Other objects and advantages will be apparent from the following description, wherein reference is made to the accompanying drawings illustrating a preferred embodiment of my invention and wherein similar reference numerals designate similar parts throughout the several views.

In the drawings:

Figure 1 is a side elevation of a shock absorber constructed in accordance with my invention, and shown in position upon a vehicle.

Figure 2 is an enlarged plan view of the body portion of the shock absorber.

Figure 3 is a central vertical section therethrough.

Figures 4 and 5 are cross-sections taken substantially on the lines 4—4 and 5—5 of Figure 3.

Figure 6 is a detail side elevation of the valve utilized in one of the liquid transfer tubes, and Figure 7 is a side elevation of one of such tubes.

Referring now to the drawings, the numeral 5 designates the frame, or other desired portion, of a vehicle body, and 6 one of the supporting springs for such body. Obviously, any type of vehicle supporting spring and various types of vehicle bodies may be utilized in connection with the shock absorber forming the claimed subject matter herein, and accordingly no attempt has been made to illustrate or describe a completely operative vehicle assembly. Instead, only so much of a vehicle body and its supporting springs are shown herein as is believed to be necessary to depict the assembly of a preferred mounting for my improved shock absorber. The shock absorber body portion is preferably secured to the frame 5 by bolts 7 or other suitable securing elements passing through apertured bosses 8 circumferentially spaced around the body portion. Within the body portion is provided a movable member, the extent of movement of which is controlled by an operating arm 9 suitably connected with a supplemental arm 10 connected adjacent its lower extremity with the spring 6. As best illustrated in Figure 1, the arms 9 and 10 are connected to each other by means of a ball and socket joint, and the lower extremity of the arm 10 is formed with a ball fitting into a socket carried by a bracket 11 suitably secured upon the spring 6. Such an arrangement will permit the requisite movements of the arms 9 and 10, but it is to be understood that other forms of connections may be substituted therefor.

The body of the shock absorber preferably comprises a cylindrical housing 12 having an open side and a cover plate 13 adapted to close the open side of the housing, and through instrumentalities, such as the gasket 14 and screws 15, seal the housing against loss of liquid contained therein. The side of the housing opposite the cover plate 13 is bored to provide a bearing for the screw shaft 16, and the outer edge of the aperture may be closed by suitable means to prevent the leakage of liquid around the shaft, such as the stuffing box 17. The outer extremity of the shaft 16 is formed with a polygonal portion 16$^a$ upon which the operating arm 9 is suitably clamped, as by means of the clamping bolt 18. (Note Figures 1 and 3.) The opposite end of the shaft 16 is journaled in a recess in the cover plate 13, and interiorly of the housing the shaft is provided with a portion bearing comparatively wide screw threads 16$^b$ intermeshing with similar screw threads formed in a central aperture of a traveler nut 19, which is kept from rotating with the shaft 16 by a plurality of apertured sleeves, as 20 and 21, passing through openings in the traveler nut. The ends of the tubes 20 and 21 are received in suitable recesses in the housing 12 and cover plate 13 respectively, and adjacent their ends the tubes are formed with elongated apertures to permit passage of liquid into and out of the tubes, as hereinafter described. Thus the tube 20 is provided with an elongated aperture 20$^a$ for the introduction of liquid into the tube 20 and with an elongated aperture 20$^b$ for egress of liquid from the tube, the outflow of the liquid from the tube 20 being controlled by a spring-pressed valve 20$^c$ normally pressed against a seat within the tube by the coil spring 20$^d$, the apertures 20$^a$ and 20$^b$ of the tubes being on opposite sides of the traveler nut 19. Similarly, the tube 21 is formed with an elongated aperture 21$^a$ for the introduction of liquid into the tube and with an elongated aperture 21$^b$ for the egress of liquid from the tube, these apertures being on opposite sides of the traveler nut 19. The outflow of the liquid from the tube through the aperture 21$^b$ is controlled by the spring-pressed valve 21$^c$ normally pressed against a seat within the tube by the coil spring 21$^d$. It is to be noted that the intake apertures 20$^a$ and 21$^a$ of the respective tubes are on opposite sides of the traveler nut 19, and that the egress apertures 20$^b$ and 21$^b$ of the respective tubes are on opposite sides of the traveler nut 19, whereby movement of the traveler nut in one direction will serve to force liquid into one of the tubes, as 20, but not into the other, while movement of the traveler nut 19 in the opposite direction will force the liquid into the other tube, as 21, and not into the first-mentioned tube.

The interior of the housing 12 is intended to be filled with a suitable liquid, such as an oil mixture that will not congeal at the temperatures in which the vehicle is being used, the oil being introduced through an intake aperture in the upper portion of the housing, which aperture may then be closed by a suitable plug 22. The traveler nut 19 is normally located intermediate the side wall of the housing and the cover plate 13 so that the liquid extends between the traveler nut and the side walls of the housing. The peripheral wall of the housing is preferably formed with portions of different diameters, the smaller diameter portion, as 23, (note Figure 3) being of but slightly greater diameter than the diameter of the traveler nut 19. The larger diameter portion of the peripheral wall of the housing, as 24, is of sufficient diameter to provide for a comparatively easy passage of liquid between the periphery of the traveler nut and the wall 24, and intermediate the portions 23 and 24 is arranged a tapered portion 25, substantially as shown in Figure 3. By virtue of this arrangement of the peripheral wall of the housing 12, movement of the traveler nut 19 toward the cover plate 13 will be comparatively easy, the liquid between the traveler nut and the cover plate 13 being permitted to flow around the traveler nut as well as through the tube 21; but movement of the traveler nut in the opposite direction, i. e. toward the apertured side wall of the housing, will be comparatively greatly retarded, the liquid between the traveler nut 19 and the side wall of the housing being permitted to escape around the periphery of the traveler nut only until the nearest edge of the traveler nut enters the lesser diameter portion 23 of the peripheral wall of the housing, whereupon substantially all liquid passing from one side of the traveler nut to the other must pass through the tube 20; and during the movement toward the lesser diameter portion 23 of the housing, the volume of liquid escape around the periphery of the traveler nut will be gradually diminished because of the tapered portion 25 of the peripheral wall of the housing. Accordingly, the flexibility of the vehicle supporting spring 6 may be utilized in one direction of movement without serious retardation by the shock absorber, while the rebound of the spring will be retarded, at first gently and then with increasing opposition until the movement permitted by the shock absorber is only that allowed by the passage of liquid from one side of the traveler nut to the other through the tube 20.

The operation of my improved shock absorber is believed to be apparent. With the parts normally arranged substantially as shown in Figure 1, with the traveler nut 19 substantially centrally of the housing 12, movement of the frame 5 and spring 6 toward each other will serve to operate the operating arm 9 so that the traveler nut 19 is moved toward the end plate 13. Such movement of the traveler nut forces liquid from between the traveler nut and the end plate 13 to the other side of the nut, the liquid traveling both around the periphery of the nut and through the tube 21, the pressure on the liquid serving to force the valve 21ᶜ away from its seat to permit egress of liquid from the tube through the aperture 21ᵇ (note Figure 3). Rebound movements, i. e. movements wherein the frame 5 and spring 6 tend to move away from each other, serve to swing the operating arm 9 in the reverse direction, and so move the traveler nut 19 toward the integral side wall of the housing. Such movement of the traveler nut forces liquid from between the nut and the integral end wall of the housing to the opposite side of the nut, the liquid passing around the periphery of the nut as long as permitted and then being forced to travel almost exclusively through the tube 20. This result is secured by the different diameter portions of the housing 12, the liquid at first escaping freely around the periphery of the nut and then to a lesser extent as the adjacent edge of the traveler nut passes through the tapered wall portion 25 of the housing, and finally when the traveler nut enters the smaller diameter portion 23 of the housing, escape of the liquid around of the nut being practically nil. The pressure on the liquid between the traveler nut and the integral end wall of the housing is communicated to the valve 20ᶜ and moves said valve away from its seat to uncover more and more of the egress aperture 20ᵇ of the tube 20. As the movements imparted to the operating arm 9 become less, the traveler nut is returned to its normal position substantially centrally of the housing 12, and the coil springs reseat their respective valves.

While it will be apparent that the illustrated embodiments of my invention herein disclosed are well calculated to adequately fulfill the objects and advantages primarily stated, it is to be understood that the invention is susceptible to variation, modification, and change within the spirit and scope of the subjoined claims.

Having described my invention, what I claim is:

1. In a device of the character described, the combination with two members of a vehicle adapted to move toward and from each other, of a shock absorber mounted upon one of the members, and comprising a cylindrical oil containing housing, the inner peripheral wall of which is formed with end portions of different diameters, a screw shaft journaled in the housing, a traveler nut meshing with the screw shaft and normally arranged within the larger diameter portion of the housing, the diameter of the traveler nut being substantially equal to the diameter of the smaller peripheral portion of the housing, means for preventing rotation of the traveler nut, and means connected to the other of said members and arranged to oscillate the screw shaft upon relative movements of the members.

2. In a device of the character described, the combination with two members of a vehicle adapted to move toward and from each other, of a shock absorber mounted upon one of the members, and comprising a cylindrical oil containing housing, the inner peripheral wall of which is formed with end portions of different diameters connected by an intermediate tapered wall portion, a screw shaft journaled in the housing, a traveler nut meshing with the screw shaft and normally arranged within the larger diameter portion of the housing, the diameter of the traveler nut being substantially equal to the diameter of the smaller peripheral portion of the housing, means for preventing rotation of the traveler nut, and means connected to the other of said members and arranged to oscillate the screw shaft upon relative movements of the members, whereby oscillation of the shaft in one direction will move the traveler nut from the larger diameter portion of the housing toward the smaller diameter portion thereof through the intermediate tapered portion.

3. In a device of the character described, the combination with two members of a vehicle adapted to move toward and from each other, of a shock absorber mounted upon one of the members, and comprising a cylindrical oil containing housing, the inner peripheral wall of which is formed with end portions of different diameters, a screw shaft journaled in the housing, a traveler nut meshing with the screw shaft and normally arranged within the larger diameter portion of the housing, the diameter of the traveler nut being substantially equal to the diameter of the smaller peripheral portion of the housing, the traveler nut being also formed with apertures substantially parallel to the screw shaft, spaced hollow tubes passing through the apertures in the traveler nut and each having inlet and outlet apertures on opposite sides of the traveler nut, spring pressed valves arranged within said tubes to normally close the outlet apertures, and means connected with the other of said members for oscillating the screw shaft upon relative movements of the members.

4. In a device of the character described, the combination with two members of a vehicle adapted to move toward and from each other, of a shock absorber mounted upon one of the members, and comprising a cylindrical oil containing housing, the inner peripheral wall of which is formed with end portions of different diameters, a screw shaft journaled in the housing, a traveler nut meshing with the screw shaft and normally arranged within the larger diameter portion of the housing, the diameter of the traveler nut being substantially equal to the diameter of the smaller peripheral portion of the housing, the traveler nut being also formed with a pair of apertures substantially parallel to the screw shaft, a pair of spaced hollow tubes passing through the apertures in the traveler nut and each having inlet and outlet apertures on opposite sides of the traveler nut, spring pressed valves arranged within said tubes to normally close the outlet apertures, the outlet apertures of the tubes being adjacent opposite ends of the housing, and means connected with the other of said members for oscillating the screw shaft upon relative movements of the members.

5. In a device of the character described, the combination with two members of a vehicle adapted to move toward and from each other of a shock absorber mounted upon one of the members, and comprising a cylindrical oil containing housing, having an open end and having its opposite end wall centrally apertured to form a journal bearing, the inner peripheral wall being formed with end portion of different diameters, a screw shaft journaled in the apertured end wall of the housing, a cover plate for the open end of the housing provided with a central recess forming a bearing for the adjacent end of the shaft, a traveler nut meshing with the screw shaft and normally arranged within the larger diameter portion of the housing, the diameter of the traveler nut being substantially equal to the diameter of the smaller peripheral portion of the housing, means for preventing rotation of the traveler nut, and means connected to the other of said members and arranged to oscillate the screw shaft upon relative movements of the members.

6. In a device of the character described, the combination with two members of a vehicle adapted to move toward and from each other, of a shock absorber mounted upon one of the members, and comprising a cylindrical oil containing housing, having an open end and having its opposite end wall centrally apertured to form a journal bearing, the inner peripheral wall being formed with end portions of different diameters connected by an intermediate tapered portion, a screw shaft journaled in the apertured end wall of the housing, a cover plate for the open end of the housing provided with a central recess forming a bearing for the adjacent end of the shaft, a traveler nut meshing with the screw shaft and normally arranged within the larger diameter portion of the housing, the diameter of the traveler nut being substantially equal to the diameter of the smaller peripheral portion of the housing, means for preventing rotation of the traveler nut, and means connected to the other of said members and arranged to oscillate the screw shaft upon relative movements of the members, whereby oscillation of the shaft in one direction will move the traveler nut from the larger diameter portion of the housing toward the smaller diameter portion thereof through the intermediate tapered portion.

7. In a device of the character described, the combination with two members of a vehicle adapted to move toward and from each other, of a shock absorber mounted upon one of the members, and comprising a cylindrical oil containing housing, having an open end and having its opposite end wall centrally apertured to from a journal bearing, the inner peripheral wall being formed with end portions of different diameters, a screw shaft journaled in the apertured end wall of the housing, a cover plate for the open end of the housing provided with a central recess forming a bearing for the adjacent end of the shaft, a traveler nut meshing with the screw shaft and normally arranged within the larger diameter portion of the housing, the diameter of the traveler nut being substantially equal to the diameter of the smaller peripheral portion of the housing, the traveler nut having a pair of apertures therethrough spaced from the shaft, a pair of spaced hollow tubes passing through the apertures in the traveler nut and having their ends in contact with the cover plate and apertured end wall of the housing, each tube having inlet and outet apertures arranged respectivey on opposite sides of the traveler nut, spring pressed valves arranged within said tubes to normally close the outlet apertures, the outlet apertures of the tubes being adjacent opposite ends of the housing, and means connected with the other of said members for oscillating the screw shaft upon relative movements of the members.

8. In a device of the character described, the combination with two members of a vehicle adapted to move toward and from each other, of a shock absorber mounted upon one of the members, and comprising a cylindrical oil containing housing, having an open end and having its opposite end wall centrally apertured to form a journal bearing, the inner peripheral wall being formed with end portions of different diameters connected by an intermediate tapered portion, a screw shaft journaled in the apertured end wall of the housing, a cover plate for the open end of the housing provided with a central recess forming a bearing for the adjacent end of the shaft, a traveler nut meshing with the screw shaft and normally arranged within the larger diameter portion of the housing, the diameter of the traveler nut being substantially equal to the diameter of the smaller peripheral portion of the housing, the traveler nut having a pair of apertures therethrough spaced from the shaft, a pair of spaced hollow tubes passing through the apertures in the traveler nut and having their ends in contact with the cover plate and apertured end wall of the housing, each tube having inlet and outlet apertures arranged respectively on opposite sides of the traveler nut, spring pressed valves arranged within said tubes to normally close the outlet apertures, the outlet apertures of the tubes being arranged adjacent opposite ends of the housing, and means connected to the other of said members and arranged to oscillate the screw shaft upon relative movement of the members, whereby oscillation of the shaft in one direction will move the traveler nut from the larger diameter portion of the housing toward the smaller diameter portion thereof through the intermediate tapered portion.

In testimony whereof I sign this specification.

OTTO A. KRENKE.